United States Patent [19]
Kwon

[11] Patent Number: 5,905,487
[45] Date of Patent: May 18, 1999

[54] DATA INPUT DEVICE AND METHOD FOR USE WITH A VIRTUAL REALITY SYSTEM

[75] Inventor: Tae-Kyung Kwon, Seoul, Rep. of Korea

[73] Assignee: Daewoo Electronics Co., Ltd., Rep. of Korea

[21] Appl. No.: 08/736,066

[22] Filed: Oct. 23, 1996

[51] Int. Cl.[6] .............................. G09G 5/00; G09G 5/08
[52] U.S. Cl. ........................................... 345/158; 345/156
[58] Field of Search ................................... 345/156, 161, 345/167, 158

[56] References Cited

U.S. PATENT DOCUMENTS

| | | | |
|---|---|---|---|
| 4,795,952 | 1/1989 | Brandstetter | 318/560 |
| 4,853,630 | 8/1989 | Houston | 324/208 |
| 4,945,650 | 8/1990 | Hird | 33/763 |
| 4,988,981 | 1/1991 | Zimmerman et al. | 340/709 |
| 5,184,319 | 2/1993 | Kramer | 364/806 |
| 5,442,729 | 8/1995 | Kramer et al. | 395/2.8 |
| 5,451,924 | 9/1995 | Massimino et al. | 340/407.1 |
| 5,488,362 | 1/1996 | Ullman et al. | 341/20 |
| 5,512,919 | 4/1996 | Araki | 345/156 |
| 5,555,894 | 9/1996 | Doyama et al. | 128/739 |

*Primary Examiner*—Jeffery Brier
*Assistant Examiner*—David L. Lewis
*Attorney, Agent, or Firm*—Pennie & Edmonds LLP

[57] ABSTRACT

A data input device for use with a virtual reality system comprises an upper case, a lower case rotatably supporting the upper case, five push-buttons, and a potentiometer. The push-buttons correspond to the fingers of a virtual hand displayed on a screen of the virtual reality system, respectively, and are located on an upper portion of the upper case. Disposed under each push-button is a sensor which is activated when the corresponding push-button is pressed, which, in turn, allow a signal to be transmitted to a CPU. The signal from the sensor determines the corresponding finger to be flexed. The potentiometer generates signals which linearly vary depending on a rotation angle of the upper case and transmits the signals to the CPU. The determined finger is linearly flexed in response to the signals from the potentiometer. If no finger is determined to be flexed, the hand is linearly rotated in response to the signals.

1 Claim, 5 Drawing Sheets

DATA INPUT DEVICE AND METHOD FOR USE WITH A VIRTUAL REALITY SYSTEM

FIELD OF THE INVENTION

The present invention relates to a virtual reality system; and, more particularly, to a data input device and method for use therewith, which is capable of reducing user's hand fatigue.

DESCRIPTION OF THE PRIOR ART

There is shown in FIG. 1 a conventional data input device for use in a virtual reality system disclosed in U.S. Pat. No. 4,988,981, which includes a glove assembly 12 provided with a plurality of sensors for detecting motion thereof and means 20 for sensing a position of the glove assembly 12. The glove assembly 12 and the position sensing means 20 are electrically connected to a interface circuit 14.

When an user wears and moves the glove assembly 12, the position sensing means 20 and the sensors of the glove assembly 12 detect the position and motion of the glove assembly 12 and transmit signals therefor to a host computer 16 through the interface circuit 14, respectively. The host computer 16, then, controls the position and motion of a virtual hand 26 displayed on a screen 28 in response to the signals.

However, in such a conventional data input system, the user must wear the glove assembly 12 and move it in air, resulting in considerable hand fatigue during a prolonged use.

SUMMARY OF THE INVENTION

It is, therefore, a primary object of the invention to provide a data input device and a method for use with a virtual reality system, which is capable of reducing user's hand fatigue.

In accordance with an aspect of the present invention, there is provided a data input device for use with a virtual reality system provided with a central processing unit and a screen on which a virtual hand is displayed, the apparatus comprising: an upper case; a lower case rotatably supporting the upper case; means for determining at least one finger of the virtual hand to be flexed; and means for transmitting signals linearly varying depending on a rotation angle of the upper case to the central processing unit, wherein the determined finger is linearly flexed in response to the signals.

In accordance with another aspect of the present invention, there is provided a data input method for use with a virtual reality system having a central processing unit and a screen on which a virtual hand is displayed, the method comprising the steps of: determining at least one finger of the virtual hand to be flexed; rotating an upper case; and transmitting signals linearly varying depending on a rotation angle of the upper case to the central processing unit, wherein the determined finger is linearly flexed in response to the signals.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
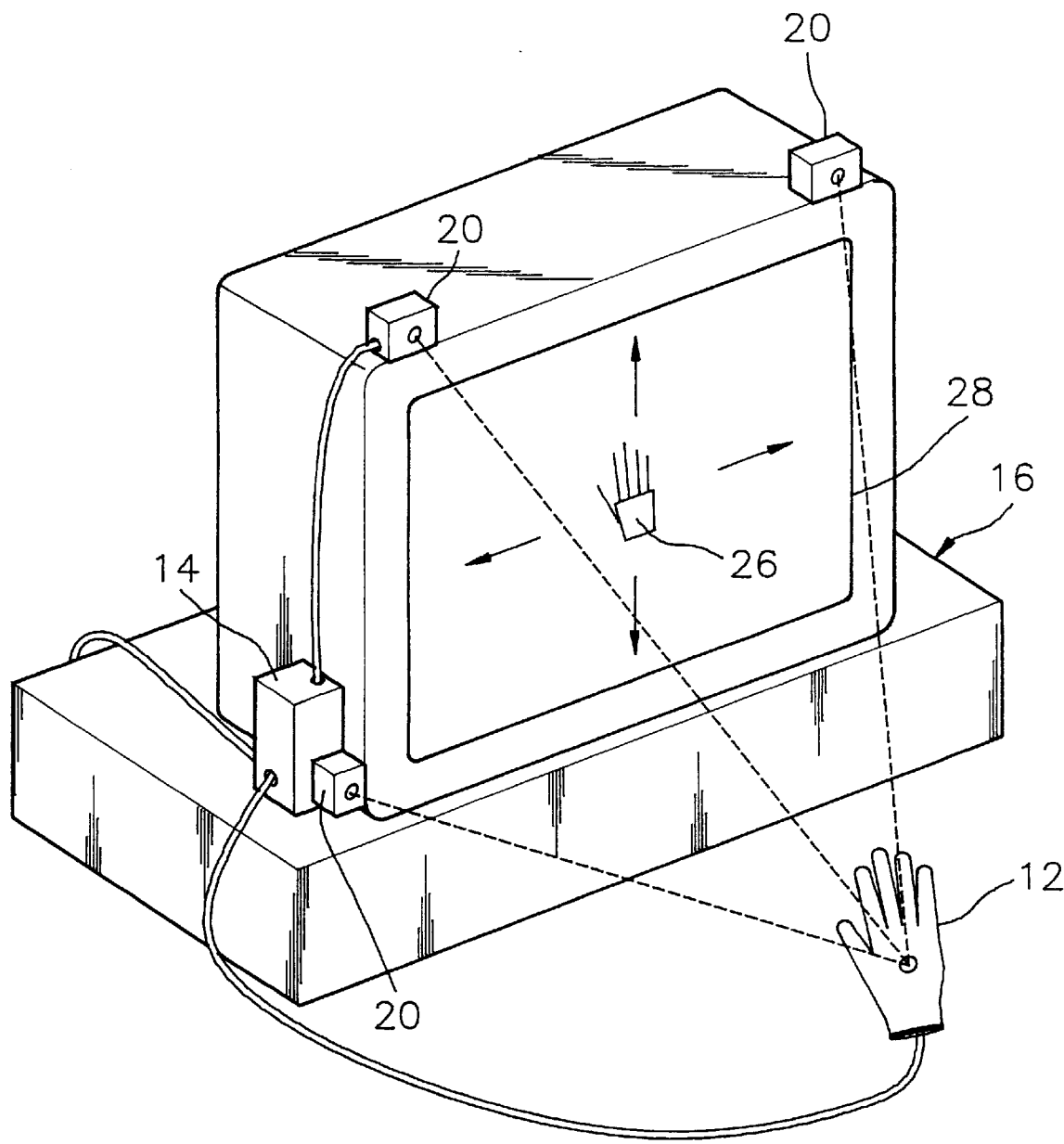
FIG. 1 represents a schematic perspective view of a conventional data input device.
Figure 2:
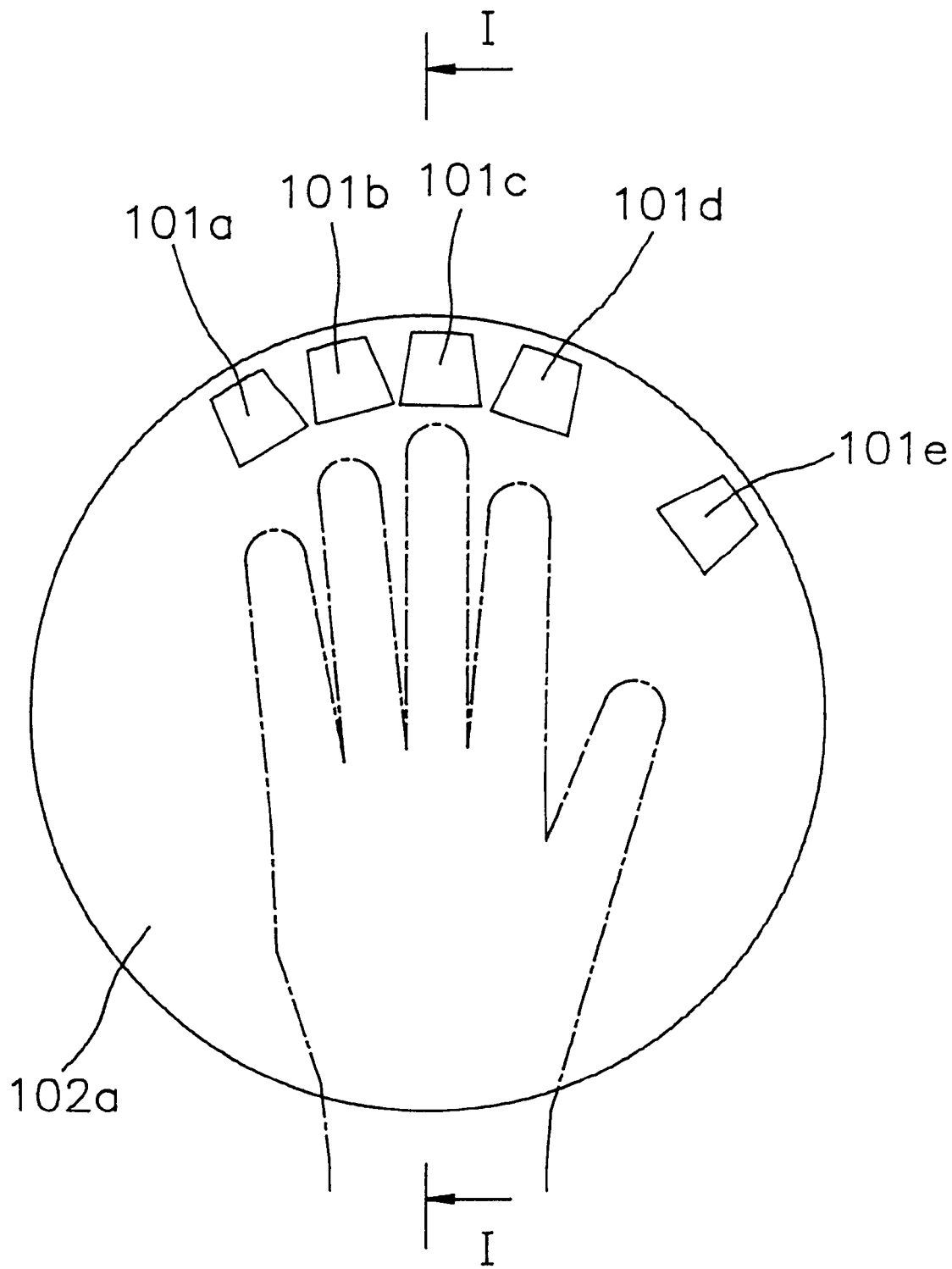
FIG. 2 depicts a schematic top view of a data input device for use with a virtual reality system in accordance with a preferred embodiment of the present invention.
Figure 3:
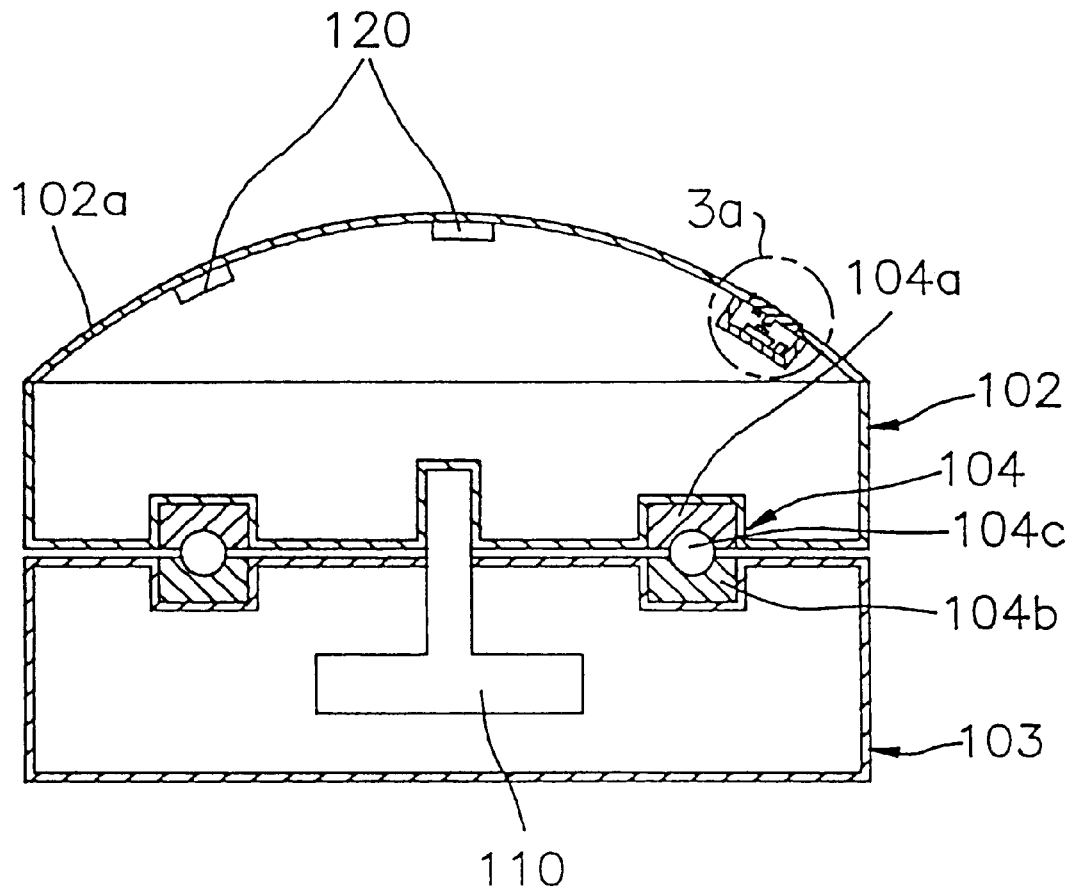
FIG. 3 shows a schematic cross-sectional view of the data input device of the present invention taken along the line I—I in FIG. 2
Figure 3A:
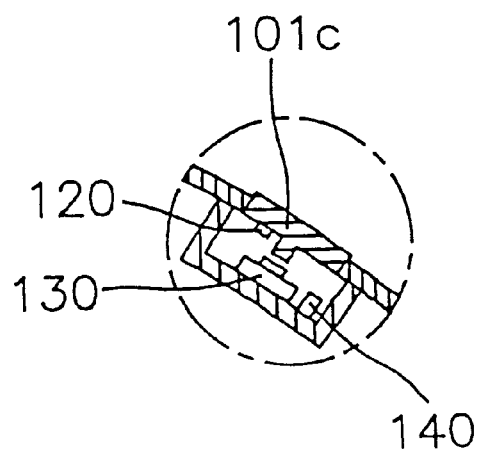
FIG. 3a is a partial enlarged view of FIG. 3.

There are shown in FIGS. 2 and 3 a schematic top view and a schematic cross-sectional view of a data input device for use with a virtual reality system in accordance with a preferred embodiment of the present invention.

The apparatus of the present invention includes an upper case 102, a lower case 103, five push-buttons 101a to 101e, and a potentiometer 110 for transmitting signals varying depending on a rotation angle of the upper case 102 with respect to a central processing unit ("CPU") (not shown).

Figure 5:
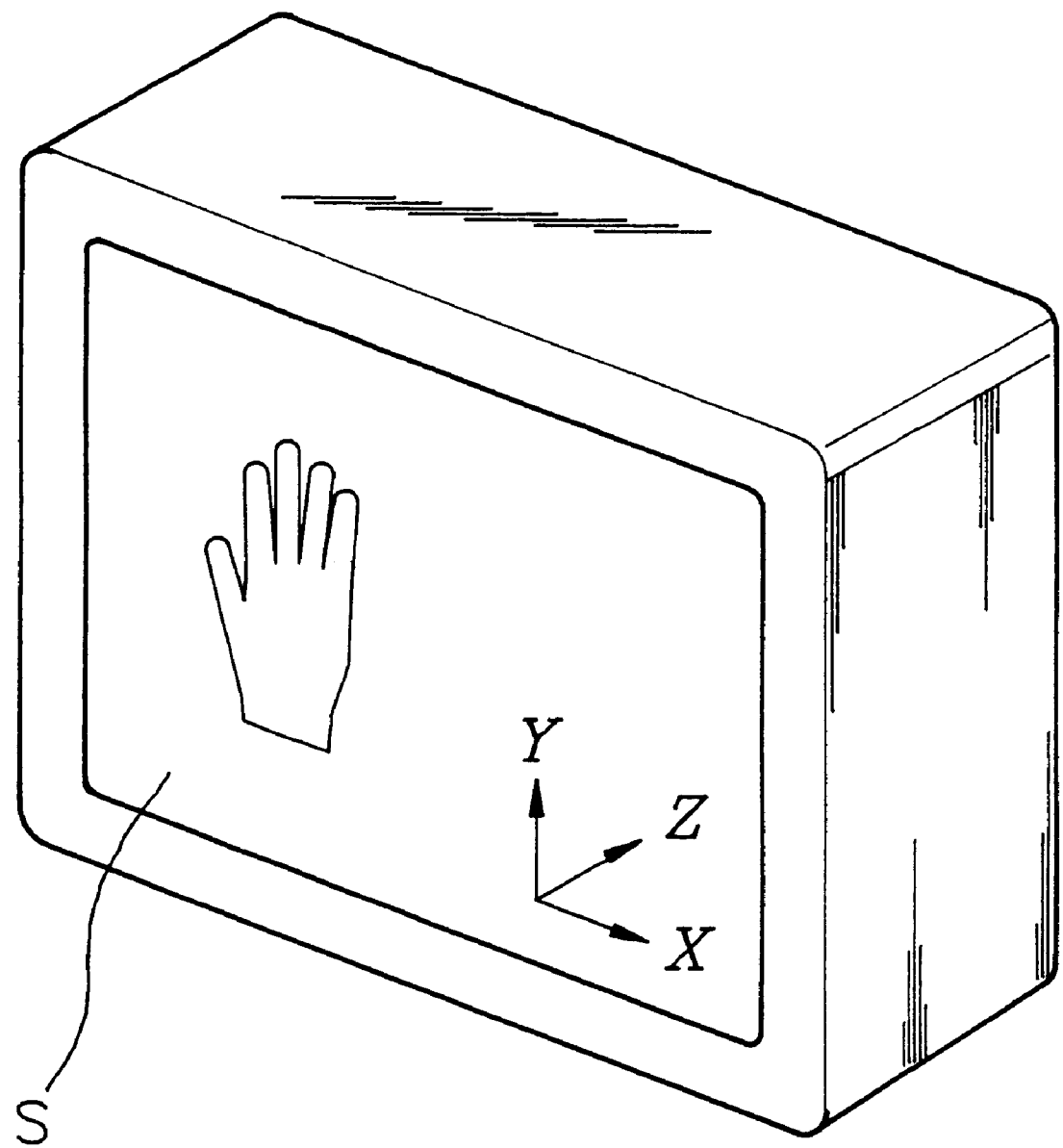
FIG. 5 illustrates a schematic perspective view of the screen of the virtual reality system.

The push-buttons 101a to 101e correspond to the fingers of a virtual hand displayed on a screen S (see FIG. 5) of the virtual reality system, respectively, and are located on an upper portion 102a of the upper case 102. Disposed under each push-button 101a to 101e is a sensor 130 which is activated when the corresponding push-button is pressed, transmitting a signal to the CPU through, e.g., an electric circuit (not shown). The signal from each sensor 130 determines the corresponding finger to be flexed.

Interposed between the upper and the lower cases 102 and 103 is a thrust ball bearing 104 which is provided with annular upper and lower members 104a and 104b and a plurality of balls 104c situated therebetween. The lower case 103, therefore, rotatably supports the upper case 102 through the thrust ball bearing 104.

The potentiometer 110 is mounted in the lower case 103. It generates signals linearly varying depending on a rotation angle of the upper case 102 and transmits the signals to the CPU.

A feedback means 120 such as a vibrator may be attached under portions of the upper case 102 which are in contact with the user's hand and under the push-buttons 101a to 101b, thereby, when the user touches a virtual object on the screen S, allowing the user to feel as if the user really touches it.

Furthermore, five LED lamps 120 may be installed under the push-buttons 101a to 101e, respectively, to indicate the activation of the corresponding sensor 130.

A data input process and operation of the device of the present invention will now be described.

First, the user pushes at least one of the push-buttons 101a to 101e, causing the corresponding sensor 130 to be activated, which will, in turn, allow a signal to be transmitted to the CPU so that the finger displayed on the screen S corresponding to the activated sensor 130 is flexed.

Next, the user rotates the upper case 102 and, then, the potentiometer 110 transmits to the CPU signals which linearly vary depending on a rotation angle of the upper case 102 so that the determined finger is linearly flexed in response to the signals from the potentiometer 110.

At this time, if the user rotates the upper case 102 without pushing any one of the push-buttons 101a to 101e, i.e., if no finger is determined to be flexed, the hand displayed on the screen S is linearly rotated in response to the signals from the potentiometer 110.

Figure 4:
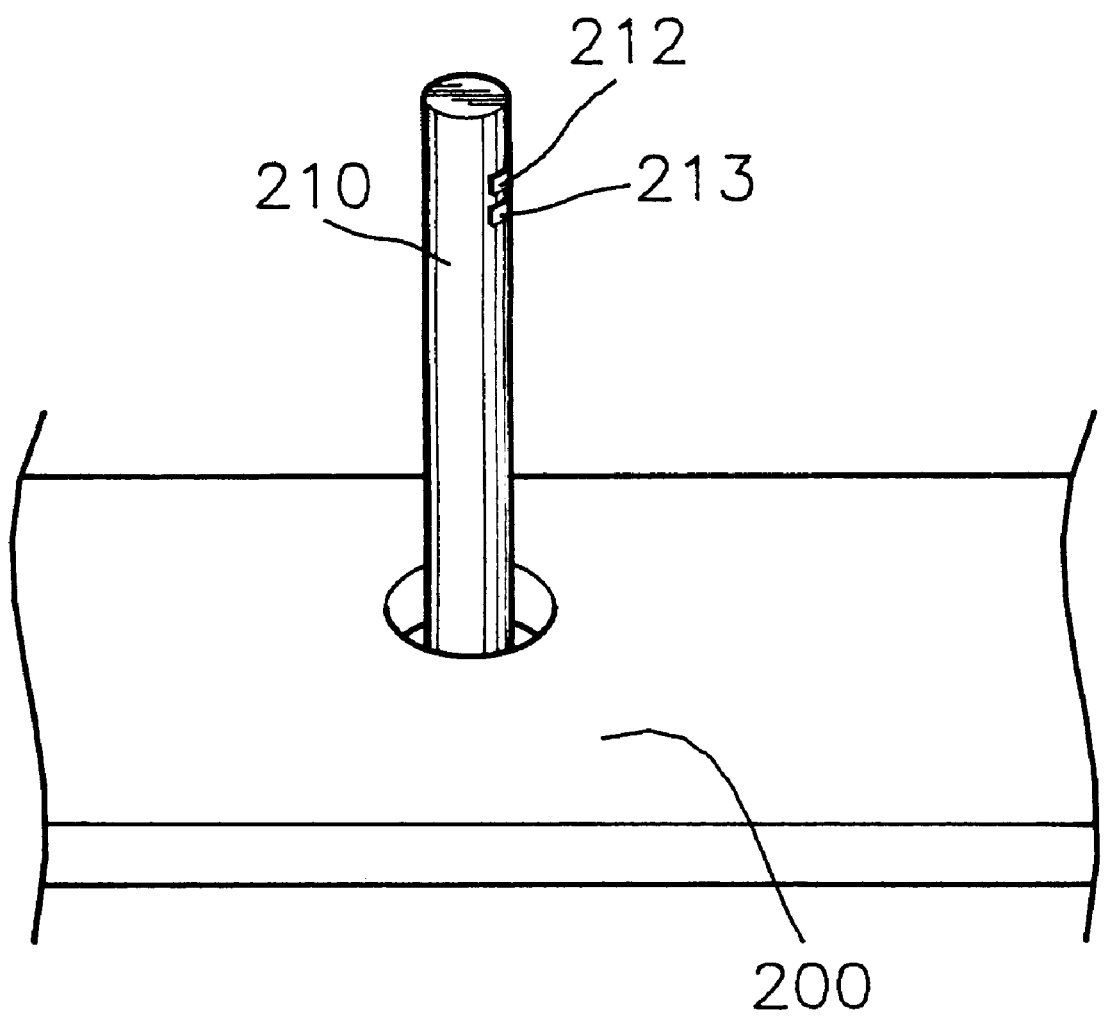
FIG. 4 presents a schematic perspective view of a control lever for inputting 3-dimensional position data of a virtual hand displayed on a screen of the virtual reality system.

On the other hand, there is shown in FIG. 4 a control lever assembly for inputting a 3-dimensional position data of the virtual hand displayed on the screen S. The control lever assembly is incorporated in the data input device of the present invention. The control lever assembly includes a control panel 200, a control lever 210, an upper and a lower buttons 212, 213. The control lever 210 is pivotably mounted to the control panel 200 and transmits to the CPU a signal corresponding to the position on the (X, Z) plane. The upper and lower buttons 212, 213 transmits to the CPU a signal corresponding to the position on the Y-axis. It is, therefore, possible to move the hand to a desired 3-dimensional position on the screen S by manipulating the control lever 210 and the upper and lower buttons 212, 213.

In such a data input device of the present invention, it is possible to input data for the virtual hand displayed on the screen by simply pushing the push-button and rotating the upper case, thereby reducing user's hand fatigue.

Although the invention has been shown and described with respect to the preferred embodiments, it will be understood by those skilled in the art that various changes and modifications may be made without departing from the spirit and scope of the invention as defined in the following claims.

What is claimed is:

1. A data input device for use with a virtual reality system provided with a central processing unit and a screen on which a virtual hand is displayed, said device comprising:

a lower case;

an upper case rotatable mounted on the lower case;

a potentiometer mounted in the lower case and arranged to detect a rotational angle of the upper case relative to the lower case, and generate a first signal in response to said rotational angle;

five pushbuttons located on the upper case, each pushbutton corresponding to a finger on the virtual hand and associated with a sensor, each of said sensors arranged to detect a pushing of a corresponding finger of a user's hand and generate a second signal in response thereto, wherein the virtual hand is arranged to rotate in response to said first signal and a corresponding finger of the virtual hand is arranged to flex in response to said second signal;

a control lever assembly arranged to input 3-dimensional position data of the virtual hand display on the screen, said control lever assembly comprising a control lever pivotably mounted on a control panel and arranged to transmit an X-Z plane position of the virtual hand, and a pair of buttons mounted on the control lever and arranged to transmit a Y-axis position of the virtual hand;

a vibrator attached under selected portions of the upper case, whereby a user can feel when the virtual hand on the screen touches a virtual object; and a thrust ball bearing interposed between said lower and upper cases, said thrust ball bearing provided with annular upper and lower members and a plurality of balls situated therebetween.

* * * * *